(No Model.) 3 Sheets—Sheet 1.

G. WHITE.
THRASHING AND SEPARATING MACHINE.

No. 414,738. Patented Nov. 12, 1889.

Attest
A. Edmunds
Carl Hayden

Inventor
George White
By P. J. Edmunds
Att'y (No Model.)  3 Sheets—Sheet 3.

G. WHITE.
THRASHING AND SEPARATING MACHINE.

No. 414,738. Patented Nov. 12, 1889.

Attest
A. Edmunds
Carl Hayden

Inventor
George White
By P. J. Edmunds
Atty.

United States Patent Office.

GEORGE WHITE, OF LONDON, ONTARIO, CANADA.

THRASHING AND SEPARATING MACHINE.

SPECIFICATION forming part of Letters Patent No. 414,738, dated November 12, 1889.

Application filed October 26, 1888. Serial No. 239,255. (No model.)

*To all whom it may concern:*

Be it known that I, GEORGE WHITE, a subject of the Queen of Great Britain, and a resident of the city of London, in the Province of Ontario, Canada, have invented certain new and useful Improvements in Grain-Separators, of which the following specification, taken in connection with the accompanying drawings, forms a full, clear, and exact description.

This invention relates to a machine for separating the grain from the straw and other impurities; and it consists of the improved construction and combination of parts of the same, as will be hereinafter more fully described and claimed.

Figure 1:
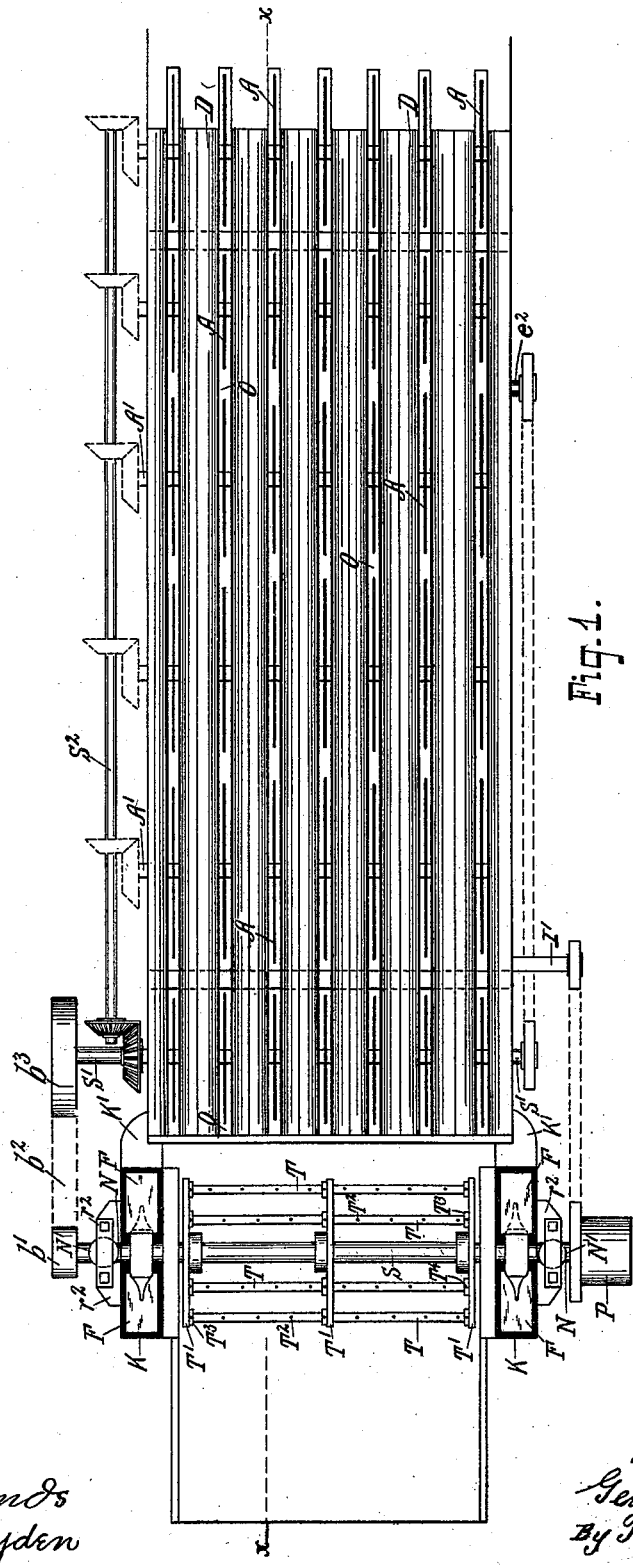
Figure 2:
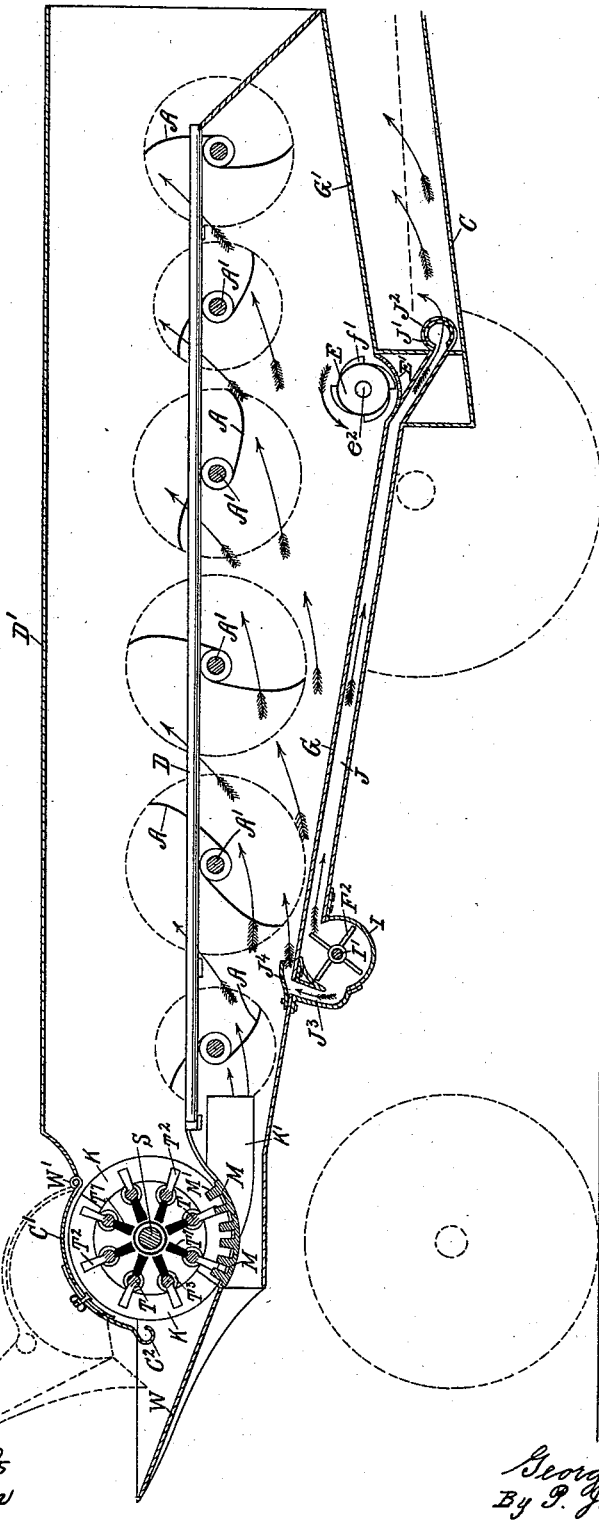
Figure 3:
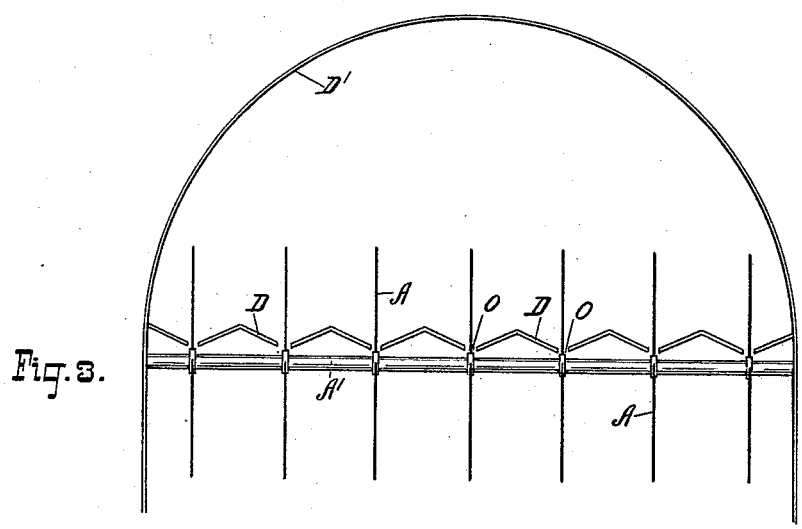

Reference being had to the accompanying drawings, already mentioned, Figure 1 is a plan view of a machine embodying my invention, showing the cover removed from the straw-deck cylinder and the adjacent fan-drums. Fig. 2 is a longitudinal sectional view of same on the line $x\,x$ of Fig. 1. Fig. 3 is an end view of the corrugated straw-deck and its cover and an end view of the agitators and one of the agitator-shafts.

This machine is constructed altogether of steel, iron, or other metal, no wood-work being used, as heretofore in machines of this class, and is operated by a belt from the engine passing over a pulley P on the cylinder-shaft S, which motion is communicated by a belt $b^2$ and pulleys $b'$ and $b^3$ to the cross-shaft S', and from the latter to the longitudinal shaft $S^2$ and agitator-shafts A' by bevel-gearing or other substantial equivalent, thereby driving all the straw-agitators from the cylinder-shaft and using only one belt $b^2$.

D designates a corrugated straw-deck extending from the cylinder the whole length and width of the machine, and A designates straw-agitators, which are rigidly secured to the agitator-shafts A'. These agitators A rotate through openings O, formed in the straw-deck D, as shown in Figs. 1, 2, and 3 of the accompanying drawings, for the purpose of agitating, lifting, and separating the straw from the grain, as well as for the purpose of carrying the straw until it is delivered to the straw-carriers.

D' designates the cover for the straw-deck, and C' the cover for the cylinder.

F designates blast-fans rigidly secured to and operated by the cylinder-shaft S in the drums K on each side of the cylinder, and K' designates tubes which conduct this blast against the under side of the straw-deck D, which blast passes upward through the openings O in said straw-deck D for the purpose of blowing the chaff, short straw, thistle-heads, and any long straw not raised by the agitators or beaters A upward away from the openings O, and the straw-deck D being corrugated or inclined toward these openings none of the grain is permitted to lodge on said straw-deck D, but is conducted toward the openings O. This, together with the blast just described, permits the grain to deliver perfectly free in large volumes or quantities through the openings O onto the grain-chute G. The effect of the blast near the rear end of the straw-deck D is to blow the chaff, short straw, &c., out with the main body of the straw as it passes onto the carriers, the latter not being shown.

$F^2$ is a fan rigidly secured to and revolving with a shaft I' in the drum I, and this shaft I' may be operated by a chain or other belt and chain wheels from the cylinder-shaft S, and J is a tube opening into the drum I, which conducts part of the blast under the riddles in the shoe C to blow and thereby separate the dust and other light impurities from the grain as it passes through the riddles in the shoe C.

$J^3$ is another tube, which opens into the drum I and conducts part of the blast created by the fan $F^2$ therein up through an opening in the inclined grain-deck G to and under the corrugated straw-deck D, which blast passes up through the openings O in the straw-deck D to supplement the action of the blast created by the fans F, which is a material benefit when separating heavy grain; and $J^4$ is a rearwardly-directed cover over the tube $J^3$ where it passes through the grain-deck G, to prevent the grain from falling into the tube $J^3$ or drum I.

Having thus described my invention, I claim—

1. The combination of the thrashing-cylinder, the blast-fans F, the horizontal straw-deck, the chute G, inclined downwardly from the cylinder and having blast-opening and cover $J^4$, rearwardly directed, the blast-conduits opening beneath the receiving end of the straw-deck, and the blast-fan I I', supplementing the action of the fans F, substantially as set forth.

2. The combination of the open straw-deck, the grain-chute G beneath it having a transverse opening in it, the cover $J^4$ thereover, and the blast-fan I I', substantially as set forth.

3. The combination of the open straw-deck, the grain-chute G beneath it having a transverse opening and cover $J^4$, the blast-fan I I', the blast-conduit J, the top wall of which is the grain-chute, and the finishing-shoe C, substantially as set forth.

In testimony whereof I affix my signature in the presence of the two undersigned witnesses.

GEORGE WHITE.

Witnesses:
P. J. EDMUNDS,
A. EDMUNDS.